March 15, 1932.    A. S. FITZ GERALD    1,849,870
TELEMETRIC SYSTEM
Filed May 26, 1927
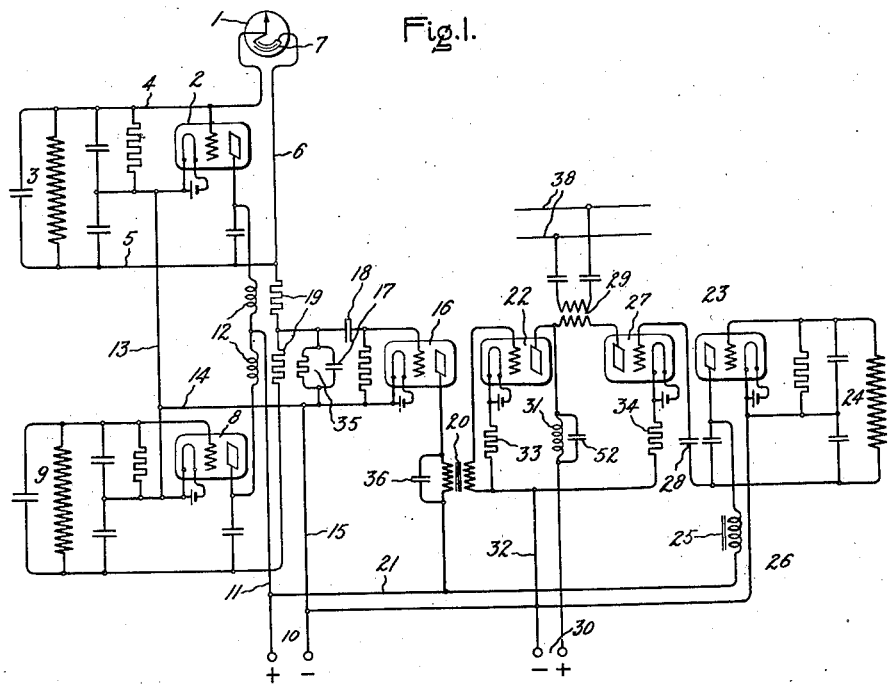
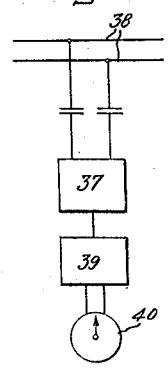
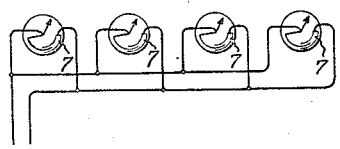
Inventor:
Alan S. Fitz Gerald,
by
His Attorney.

Patented Mar. 15, 1932

1,849,870

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

TELEMETRIC SYSTEM

Application filed May 26, 1927. Serial No. 194,468.

My invention relates to means for indicating the position of movable elements located at remote points and more particularly to the remote indication of the reading of meters. It has for its purpose to provide means whereby the position of movable elements may be indicated at remote points by means of high frequency currents transmitted either through space as by radio, or over conductors provided for the purpose, or by high frequency currents superimposed upon line conductors such as those employed in the usual power distribution system.

A principal object of the invention is to provide means of the type indicated in which the position of a movable element, such as that of a meter, will be accurately indicated at a remote point, in which the position of the movable element itself will not be affected by the apparatus employed and in which the accuracy of the indication at the remote point will not be affected by the transmission characteristics of the medium over which the high frequency currents are transmitted or by divers adjustment of the apparatus extraneous to the frequency controlling circuits.

A further purpose of the invention is to provide means by which a continuous indication of the position of the movable element may be had and one which instantly follows all fluctuation in the position of the movable element. A further purpose is to accomplish the above result without the use of synchronizing power.

A further purpose of my invention is to provide means of the type indicated in which there are no movable contacts or moving parts other than those of the indicating means themselves.

Still another purpose of my invention is to provide means by which the readings of a plurality of instruments whether located in proximity to each other or at remote points may be automatically totalized and the total continuously indicated on a single instrument.

While I shall describe my invention with particular reference to the remote indication of the position of meters, it will, of course, be understood that my invention is not limited thereto, since it is equally applicable to the indication of the position of steam throttles or valves or hydraulic gates and the like.

The novel features which I believe to be characteristic of my invention will be set out with particularity in the appended claims. My invention itself, however, both as to its organization and method of operation together with further objects and advantages thereof may best be understood by reference to the following description taken in connection with the accompanying drawings in which Fig. 1 represents the transmitting system employed as a part of my invention; Fig. 2 represents the receiving system; Fig. 3 represents a detail; and Fig. 4 represents my means for totalizing the readings of a plurality of remotely located instruments.

With reference to Fig. 1 of the drawings, 1 indicates a meter the position of which is to be indicated at a remote point. 2 represents an oscillation generator of the vacuum tube type which is provided with the usual oscillatory circuit 3 in parallel with which through conductors 4, 5 and 6 is connected a condenser 7 which is mounted upon the instrument. While I particularly mention a condenser it will be understood that a variable inductance may likewise be employed. This condenser is of variable capacity having both stationary and movable plates. The latter are attached to the movable element of the meter and are adapted to be varied in position therewith. The construction is such that the capacity between the plates of the condenser varies in accordance with the position of the movable element. It will thus be seen that the frequency of the oscillatory circuit 3, and hence the frequency of the oscillation generator 2 is variable between limits determined by the minimum and maximum capacity of the condenser. 8 is a separate oscillation generator which is provided with an oscillatory circuit 9. This oscillator during the telemetering operation is of fixed frequency, its frequency being preferably somewhat outside of the range of frequency of the oscillator 2. The anode circuits of the oscillation generators 2 and 8 are supplied with potential from the source 10 through a circuit including conductors 11, radio frequency choke coils 12, spaces between the anodes and cathodes of the devices 2 and 8, conductor 13, conductor 14 and conductor 15 back to the opposite side of the source of potential.

16 represents an electron discharge device which is utilized as a detector. The input circuit 17 of this device is supplied with oscillatory currents from both of the oscillation generators 2 and 8. The circuit from the oscillation generators 2 and 8 includes the cathodes of the oscillation generators, conductor 13, conductor 14, space between the cathode and grid of the detector 16, grid condenser 18, and resistances 19 back to one side of the oscillatory circuits 3 and 9 of the generators 2 and 8 respectively. Preferably resistance coupling is employed between the oscillation generators and the detector although it will be understood that capacitive or inductive coupling may be used. By means of resistance coupling the tendency of the oscillators to pull into step is minimized. The output circuit of the detector 16 is supplied with potential from the source 10 through a circuit including the conductor 15, conductor 14, space between the cathode and anode of the detector 16, primary winding of the output transformer 20, conductor 21 and conductor 11 to the opposite side of the source of potential 10. The secondary winding of the output transformer 20 is connected between the cathode and the grid of an electron discharge device 22 which serves as a modulator of the high frequency currents employed for transmission.

23 represents an electron discharge device which is provided with an oscillatory circuit 24 and which serves as a generator of the carrier currents which are employed in my system. The anode circuit of the device 23 is supplied with potential from the source 10 through a circuit including the conductor 11, conductor 21, radio frequency choke coil 25, space between the anode and cathode of the device 23 and conductor 26 to the opposite side of the source 10. Oscillatory currents from the oscillatory circuit of the generator 23 are impressed upon the grid circuit of an amplifier 27 through a coupling condenser 28 which is connected to one side of the oscillatory circuit 24. The anodes of the amplifier 27 and of the modulator 22 are connected together through the primary winding of the output transformer 29, the secondary of which is connected to a radiating system or to wire line conductors 38 which may be those of a power distribution system. The anodes of the devices 22 and 27 are connected through a modulation reactor 31 to the positive side of the source of potential 30, the negative side of which is connected through conductors 32 and resistances 33 and 34 to the cathodes of the devices 22 and 27 respectively. For the purpose of bypassing high frequency currents from the device 27 a capacity 52 is connected in parallel with the modulation reactor 31.

With the arrangement shown currents from both of the oscillation generators 2 and 8 are impressed upon the input circuit of the detector 16. Consequently in the output circuit of the detector 16 will flow currents having a frequency determined by the difference in frequency between the currents produced by the generators 2 and 8, or the beat frequency. By means of the filter 35 comprising a parallel combination of inductance and capacity shunted across the input circuit of the detector 16, undesirable currents of harmonic frequency are eliminated. Likewise high frequency currents which occur in the output circuit of the detector 16 are bypassed around the transformer 20 by means of condenser 36. Consequently only currents of beat frequency are impressed upon the grid of the modulating device 22.

The use of a beat oscillator in the manner described is preferable for the reason that the oscillators 2 and 8 may then be adapted to generate currents of radio frequency thereby permitting the use of a frequency varying means of unobjectionable size. The condenser 7 may be of such size that electrostatic forces between the plates will not be sufficiently great to produce appreciable error in the reading of the instrument to which it is attached and at the same time will be sufficient in size to produce a large proportionate change in the modulating frequency responsively to the position of the movable element. Thus the indication of meters of the low energy type in which the index is actuated by relatively minute forces within the instrument may be accurately transmitted to the remote point. By this means the sensitivity of the indicating device at the receiving end is greatly enhanced. It also affords the advantage that the condenser may be inserted within the housing of the usual commercial instrument.

In adjusting the frequency range which is used as a medium for transmission of intelligence as to the position of the meter 1, and which must correspond to the range of deflection of the movable element of the meter 1 the movable element of the meter is first placed at its zero position and then the oscillatory circuits 3 and 9 are so adjusted as by means of the condensers employed therein, that the frequency appearing in the output circuit of the detector 16 corresponds to the minimum frequency in the range which is to be employed as for example 800 cycles. The movable element of the meter 1 is then moved to its maximum reading position. If the frequency appearing in the output circuit of the detector 16 is not then a maximum of the desired range, as for example 1600 cycles, it may be adjusted to the maximum by means of the oscillatory circuit 3. The movable element is then returned to the minimum position and if the frequency does not then correspond to the minimum of the chosen range it may be so adjusted by means of the oscillatory circuit 9 and this process repeated until repeated setting of the movable element of the meter 1, first upon its zero position and then upon its maximum position, will produce currents in the output circuit of the detector of frequency corresponding to the minimum and the maximum respectively of the chosen range. When so adjusted intermediate positions of the movable element of the meter 1 will produce proportionate intermediate frequencies in the chosen range.

In Fig. 2 is shown the receiving circuit which is employed as a part of my system. It comprises a detector 37 which is connected to the receiving antenna or to a wire line system 38 mentioned in connection with Fig. 1. The output circuit of the detector 37 is connected preferably through audio amplifiers 39 to a frequency meter 40. As modulated radio frequency currents from the transmitting circuit are impressed upon the detector they are demodulated and audio frequency currents corresponding to those flowing in the output circuit of the detector 16 are impressed upon the frequency responsive indicating device 40. This device may be calibrated similarly with the meter 1 and therefore may be directly read as an indication of the position of the meter 1.

If it be desired special conductors may be employed for connecting my oscillation generator with the frequency responsive means at a remote point, in which case it may be unnecessary to employ the carrier current apparatus, the conductors extending directly from the output of the detector 16 to the frequency responsive indicating device at the remote points.

If it be desired to totalize the readings of a plurality of instruments and to read this total upon a single instrument, as for example, the meter 40, the condensers 7 of each of the instruments to be totalized will be connected in parallel as is shown in Fig. 3, and this parallel combination will be connected across the oscillatory circuit 3. The maximum of the employed frequency range will then occur when all of the meters are on their maximum position and the minimum when all of the meters are on their minimum position. For this purpose the condenser plates will be so shaped that the capacity between the plates will vary directly as the meter reading as the movable element passes over the meter scale.

In Fig. 4 I have shown means whereby the readings of a plurality of instruments located at separate and remote points may be read upon a single instrument. For example, if an operator at a dispatcher's station 41 on a power distribution system desired to know the total power which is being generated by a plurality of outlying stations 42, 43, 44 and 45 I have provided means whereby this may be continuously indicated by a single instrument 46 at the operator's station. In Fig. 4, 47 represents a transmitting system located at each of the outlying stations 42, 43, 44 and 45, similar to that shown in Fig. 1. Modulated radio frequency currents from these transmitting systems are transmitted either through space, or over wire line conductors 48, which may if desired be those of the power distribution system, to a receiving circuit 49 at the dispatcher's station. This receiving circuit will be similar to that shown in Fig. 2. The frequency meter 50 which is associated with the receiving circuit 49 is provided with a condenser similar to the condenser 7 of Fig. 1. A similar receiving system and frequency meter at the dispatcher's station is provided corresponding to each of the outlying stations. The condensers of the various meters 50 are connected in parallel and in parallel with the oscillatory circuit of an oscillation generator 51 so as to severally and additively affect the frequency of the generator 51. This oscillation generator may consist of a single high frequency generator or it may be a beat oscillator such as that described in connection with Fig. 1. The frequency responsive indicating device 46 which is associated with the oscillation generator 51 will then indicate the total reading of all the instruments at the outlying stations, or in the particular case mentioned the total power generated in all of the stations. Thus the operator by looking at the meter 46 can determine the total power generated by all of the outlying stations and by looking at the individual meters 50 he may determine the total power which is being generated by any individual outlying station.

While I have shown and described a particular embodiment of my invention it will, of course, be understood that I am not to be limited thereto since many modifications, both in the circuit arrangement and in the instrumentalities employed in carrying out my invention, may be made without departing from the spirit and scope of my invention as set forth in the accompanying claims.

What I claim as new and desire to secure by Letters Patent of the United States, is—

1. In a telemetric system, a measuring instrument including a movable element the position of which is determined in accordance with the quantity measured, an oscillation generator, frequency determining means associated with said oscillation generator and means for controlling said frequency determining means thereby to vary the frequency of said oscillation generator responsively to the position of said movable element, a second oscillation generator of constant frequency, means for producing currents of frequency determined by the difference between the frequencies of said two oscillation generators and frequency responsive indicating means adapted to be supplied with currents of said difference frequency for indicating the position of said movable element.

2. In a telemetric system, a measuring instrument including a movable element the position of which is determined in accordance with the quantity measured, an oscillation generator, a variable condenser associated with the circuit of said oscillation generator for controlling the frequency thereof the capacity of said condenser being variable responsively to the position of said element, a second oscillation generator of constant frequency, means for producing currents of beat frequency between the currents produced by said two oscillation generators and frequency responsive indicating means adapted to be supplied with currents of said beat frequency.

3. In a telemetric system, a source of high frequency currents, a movable element, a second source of high frequency currents, means associated with said movable element for varying the frequency of currents from said second source in accordance with the position of said movable element and over a range determined by the limits of movement of said movable element, means for modulating currents from said first source with currents varying in frequency in accordance with said second source, detecting means adapted to be supplied with said modulated currents for reproducing therefrom currents of said varying frequency, and means responsive to the frequency of said reproduced currents of varying frequency for indicating the position of said movable element.

4. In a telemetric system, a movable element, an oscillation generator, means associated with the circuit of said oscillation generator and variable responsively to movement of said movable element for controlling the frequency of said oscillation generator, a second oscillation generator of constant frequency, means for producing currents of beat frequency between the currents produced by said two oscillation generators, a third oscillation generator, means for modulating the currents produced by said third oscillation generator with said currents of beat frequency, detecting means at a remote point adapted to be supplied with said modulated currents and a frequency responsive indicating means associated with said detector for indicating the position of said movable element.

5. In a telemetric system, a movable element, an oscillation generator, a condenser associated with the circuit of said oscillation generator and with said movable element said condenser being adapted to vary the frequency of said oscillation generator responsively to the position of said movable element, a second oscillation generator of constant frequency, means for producing currents of beat frequency between the currents produced by said oscillation generators, a source of high frequency currents, means for modulating currents from said high frequency source with beat currents of said frequency, detecting means at a remote point adapted to be supplied with said modulated high frequency currents, and frequency responsive indicating means associated with said detecting means for indicating the position of said movable element.

6. In combination, an instrument having a movable element arranged for actuation through a range of movement in accordance with minute forces within the instrument, and means for producing an audible frequency variable over a range of movement in response to the position of said element while substantially maintaining the freedom of movement of said element in accordance with said minute forces, said means comprising a source of constant radio frequency oscillations, a source of oscillations of variable radio frequency differing from said constant frequency by amounts within the audible range, means for controlling the frequency of said variable source in accordance with the position of said movable element, and means for producing an audible beat note between said two radio frequency sources of oscillations.

7. In combination, a measuring instrument of the low energy type, a condenser of small capacitance mounted on said instrument and arranged to be varied in accordance with the quantity measured, a radio frequency oscillator, means whereby the frequency of said oscillator is controlled in accordance with the capacitance of said condenser, a second radio frequency oscillator of constant frequency differing from the frequency of said first oscillator by amounts within the audible range and means for producing a beat note between the oscillations produced by said two oscillators, whereby the frequency of said beat note is varied over a substantial range without impairing the accuracy of measurement of said instrument.

In witness whereof, I have hereunto set my hand this 25th day of May, 1927.

ALAN S. FITZ GERALD.

CERTIFICATE OF CORRECTION.

Patent No. 1,849,870.                          Granted March 15, 1932, to

ALAN S. FITZ GERALD.

It is hereby certified that error appears in the printed specification of the above numbered patent requiring correction as follows: Page 4, line 74, claim 5, for the word "beat" read said, and same line and claim, for "said" read beat; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.